(12) United States Patent
Juranitch et al.

(10) Patent No.: US 12,515,145 B2
(45) Date of Patent: *Jan. 6, 2026

(54) DIRTY WATER DISTILLATION AND SALT HARVESTING SYSTEM, METHOD, AND APPARATUS

(71) Applicant: HEAT IP HOLDCO, LLC, Aberdeen (GB)

(72) Inventors: James Charles Juranitch, Fort Lauderdale, FL (US); Alan Craig Reynolds, Novi, MI (US); Raymond Clifford Skinner, Coral Springs, FL (US); Thomas Raymond Juranitch, Delray Beach, FL (US)

(73) Assignee: HEAT IP HOLDCO, LLC, Aberdeen (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,235

(22) Filed: Dec. 5, 2023

(65) Prior Publication Data

US 2024/0173642 A1    May 30, 2024

Related U.S. Application Data

(63) Continuation of application No. 16/486,578, filed as application No. PCT/US2018/018614 on Feb. 19, 2018, now Pat. No. 11,872,508.

(Continued)

(51) Int. Cl.
*B01D 3/00* (2006.01)
*B01D 1/14* (2006.01)
(Continued)

(52) U.S. Cl.
CPC .............. *B01D 3/007* (2013.01); *B01D 1/14* (2013.01); *B01D 5/0039* (2013.01); *B01D 5/006* (2013.01);
(Continued)

(58) Field of Classification Search
CPC ........ B01D 3/007; B01D 1/14; B01D 5/0039; B01D 5/006; C02F 1/10; C02F 2103/10; C02F 2303/10; F22B 1/24
See application file for complete search history.

(56) References Cited

U.S. PATENT DOCUMENTS

| 4,498,542 A | 2/1985 | Eisenhawer et al. |
| 4,509,333 A | 4/1985 | Nussdorfer et al. |

(Continued)

OTHER PUBLICATIONS

Pichtel, John, "Oil and Gas Production Wastewater: Soil Contamination and Pollution Prevention", Applied and Environmental Soil Science, vol. 2016, pp. 1-24 (Year: 2016).*

(Continued)

*Primary Examiner* — Renee Robinson
(74) *Attorney, Agent, or Firm* — LAW OFFICE OF JESSE D. LAMBERT, LLC

(57) ABSTRACT

Embodiments of the present disclosure include a system for harvesting salt, and other valued material, and generating distilled water from at least one of a produced water and salt water. The system can include a direct steam generator (DSG) configured to generate saturated steam and combustion exhaust constituents. The system can include a separation system operating after the DSG, configured to separate salt from the saturated steam and combustion exhaust constituents in at least one of brine form and solid form. The system can include an energy recovery system that includes an expansion turbine configured to recover energy from the steam and exhaust constituents.

20 Claims, 5 Drawing Sheets

Related U.S. Application Data

(60) Provisional application No. 62/460,657, filed on Feb. 17, 2017.

(51) Int. Cl.
| | | |
|---|---|---|
| *B01D 5/00* | (2006.01) | |
| *C02F 1/10* | (2023.01) | |
| *F22B 1/24* | (2006.01) | |
| *C02F 103/10* | (2006.01) | |
| *F01B 23/08* | (2006.01) | |
| *F01B 23/10* | (2006.01) | |

(52) U.S. Cl.
CPC .................. *C02F 1/10* (2013.01); *F22B 1/24* (2013.01); *C02F 2103/10* (2013.01); *C02F 2303/10* (2013.01); *F01B 23/08* (2013.01); *F01B 23/10* (2013.01)

(56) References Cited

U.S. PATENT DOCUMENTS

| 5,405,503 | A | 4/1995 | Simpson et al. |
|---|---|---|---|
| 2002/0004152 | A1 | 1/2002 | Clawson et al. |
| 2010/0126172 | A1 | 5/2010 | Sami |
| 2012/0067046 | A1 | 3/2012 | Drenik et al. |
| 2014/0021030 | A1* | 1/2014 | Schubert .............. B01D 5/0015 |
| | | | 202/185.1 |
| 2014/0110109 | A1* | 4/2014 | Latimer .................. F22B 29/06 |
| | | | 166/57 |
| 2014/0123620 | A1* | 5/2014 | Huntington ........... F01K 23/101 |
| | | | 60/39.52 |
| 2014/0190817 | A1* | 7/2014 | Mays ...................... C02F 1/045 |
| | | | 203/10 |
| 2016/0319702 | A1* | 11/2016 | Martindale ............. F01K 7/165 |
| 2016/0348895 | A1 | 12/2016 | Juranitch |

OTHER PUBLICATIONS

Brittanica, The Editors of Encyclopaedia. "hard water". Encyclopaedia Brittanica, Jan. 30, 2020, https://www.britannica.com/science/hard-water. Accessed Jul. 15, 2025 (Year: 2020).

Otton, James K. and Tracey Mercier, "Produced Water brine and stream salinity," obtained from https://water.usgs.gov/orh/nrwww/otten.pdf (Year: 2004).

WIPO, The International Bureau of; International Preliminary Report on Patentability for PCT/US2018/018614; Aug. 20, 2019; 8 pages; The International Bureau of WIPO, Geneva, Switzerland.

Canadian Intellectual Property Office; Office Action of May 29, 2024 for Canadian app. No. 3053921; 5 pages; Canadian Intellectual Property Office, Gatineau, Quebec.

* cited by examiner

DIRTY WATER DISTILLATION AND SALT HARVESTING SYSTEM, METHOD, AND APPARATUS

CROSS-REFERENCE TO RELATED APPLICATIONS

This application is a continuation of U.S. application Ser. No. 16/486,578, filed 16 Aug. 2019 (the 578 application), now U.S. Pat. No. 11,872,508, which is a United States national stage application of International application no. PCT/US2018/018614, filed 19 Feb. 2018 (the '614 application) and published under International publication no. WO 2018/152463 A1 on 23 Aug. 2018. This application claims the benefit of U.S. provisional application No. 62/460,657, filed 17 Feb. 2017 (the '657 application). The '578, the '614 application and the '657 application are incorporated by reference as though fully set forth herein

FIELD OF THE INVENTION

Embodiments of the present disclosure relate generally to a method, apparatus and system for the cost-effective distillation of dirty water and the parallel harvesting of salts and other valued inorganic product.

BACKGROUND

The Hydraulic Fracturing hydrocarbon recovery process has proven to be an effective way of recovering fossil energy. It is not without negative issues. One of the undesirable traits of the process is its need for large quantities of water in the beginning of the process. A typical well will require 3 million to 5 million gallons of water in the beginning or injection part of a fracking process. Clean water is preferred for this process. There is a larger disposal requirement to dispense with fossil water or salt laden brine water which is returned during the balance of the hydrocarbon recovery process. This fossil water is known as "produced water" and contains large amounts of salts. In some cases, over 200,000 ppm of salts. For every barrel of oil recovered in a Fracking operation there is typically between 3 to 10 barrels of produced water that needs to be disposed of. To date, the current practice for produced water disposal is deep well injection. The produced water is effectively pumped deep into the ground. Unfortunately, it appears this process has precipitated seismic events or earth quakes in a number of locations. A better more effective method of produced water disposal such as the one taught in this disclosure is needed.

BRIEF SUMMARY

Various embodiments of the present disclosure include a system for harvesting salt, and other valued material, and generating distilled water from at least one of a produced water and salt water. The system can include a direct steam generator (DSG) configured to generate saturated steam and combustion exhaust constituents. The system can include a separation system operating after the DSG, configured to separate salt from the saturated steam and combustion exhaust constituents in at least one of brine form and solid form. The system can include an energy recovery system that includes an expansion turbine configured to recover energy from the steam and exhaust constituents.

Various embodiments of the present disclosure can include a system for harvesting salt, and other valued inorganic material, and generating distilled water from at least one of a produced water and salt water. The system can include a DSG configured to generate at least one of saturated steam and superheated steam, and combustion exhaust constituents. The system can include a separation system operating after the DSG, configured to separate at least one of salt in brine form or solid form and other commodities from the steam and exhaust constituents. The system can include an energy recovery system that includes an expansion turbine configured to recover energy from the steam and exhaust constituents.

Various embodiments of the present disclosure can include a system for harvesting salt, and other valued material, and generating distilled water from at least one of a produced water and salt water. The system can include a DSG configured to generate saturated steam and combustion exhaust constituents. The system can include a commodity pre-harvesting stage operating before the DSG. The system can include a separation system operating after the DSG, configured to separate salt from the saturated steam and combustion exhaust constituents in at least one of brine form and solid form. The system can include an energy recovery system that includes an expansion turbine configured to recover energy from the steam and exhaust constituents.

DETAILED DESCRIPTION

Embodiments of the present disclosure relate generally to a method, apparatus and system for the cost-effective distillation of dirty water and parallel salt, metals and other valuable commodities harvesting. The system, apparatus and method can be used in the enhanced oil recovery industry in processes such as Hydraulic Fracturing, or any other application which requires large quantities of distilled water and has available brine or salt laden water with other valued commodities, such as metals.

Figure 1:
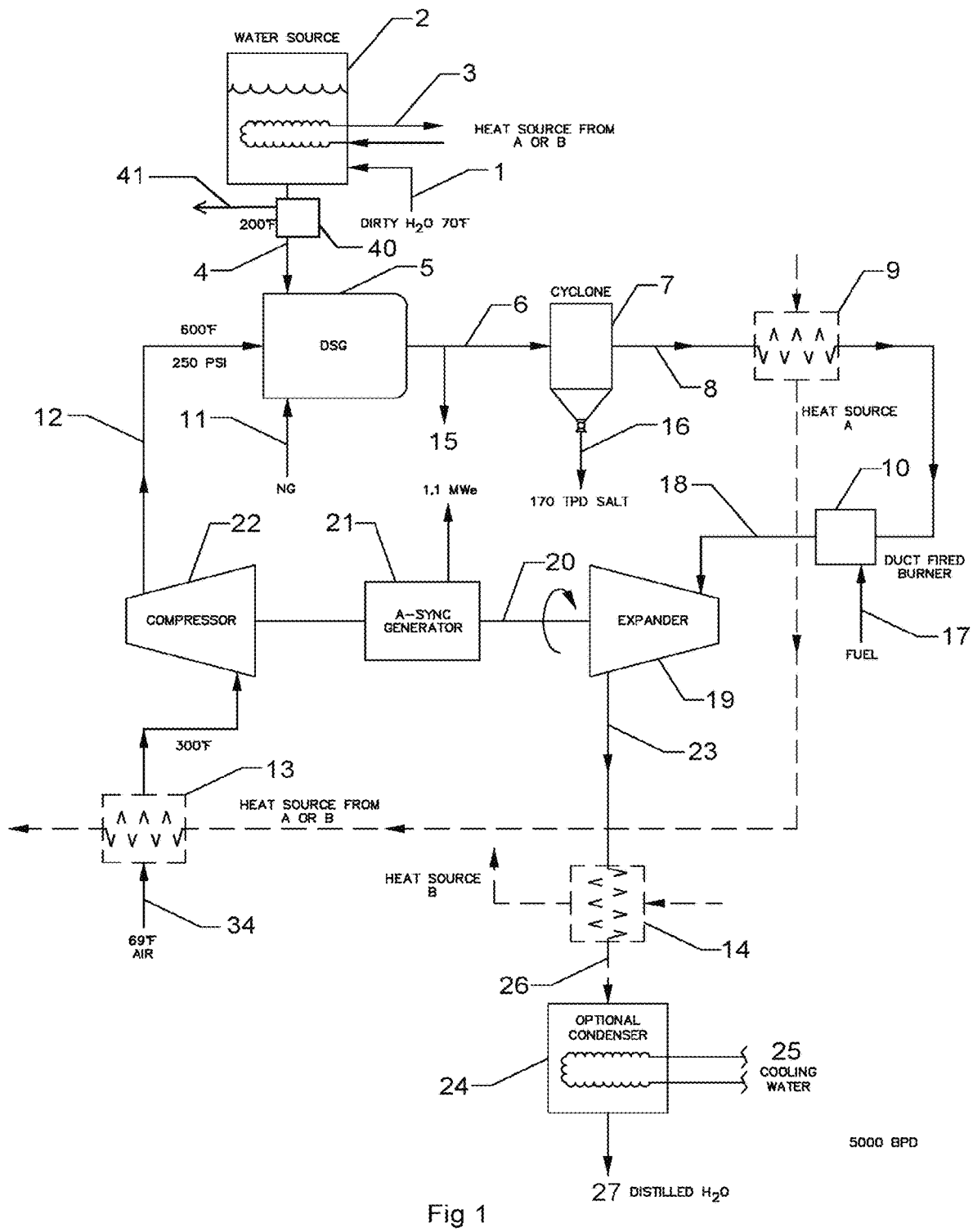
FIG. 1 depicts a simplified schematic representation of a dirty water distillation system and a salt, metals and other valuable commodity harvest system, in accordance with embodiments of the present disclosure.

FIG. 1 depicts a simplified schematic representation of a dirty water distillation system and a salt, metals and other valuable commodity harvest system, method, and apparatus, in accordance with embodiments of the present disclosure. PCT application no. US2017/062571 is hereby incorporated by reference as though fully set forth herein. In FIG. 1, dirty water or salt laden produced water from fracking operations or other salt water intensive processes can enter the process in conduit 1. The produced water can be heated in optional tank 2 with optional heat exchanger 3. Heat energy can be introduced into the system via optional heat sources A or B, as noted in heat source locations 9 and/or 14. Pre-heated produced water can travel through conduit 4 and can be brought to as high of a temperature as possible without boiling. For standard conditions, the produced water can be heated to approximately 210 degrees Fahrenheit (F). Conduit 4 can be in communication with a pre-harvest stage 40 (e.g., commodity pre-harvesting stage), which can be configured to remove select commodities such as metals. The select commodities can be separated by the pre-harvest stage 40 and can pass through pre-harvest conduit 41. These removal systems can be configured in many conventional ways such as the use of selective or non-selective Ion Exchangers. The feedwater in conduit 4 continues to a direct steam generator 5, as described in PCT application no. 2017/049613, which is incorporated by reference as though fully set forth herein. The direct steam generator (DSG) 5 is configured to operate on compressed oxidant in conduit 12 and a hydrocarbon fuel in conduit 11. The hydrocarbon fuel can be flair gas also known as casing head gas or it can be any other available fuel such as natural gas. The oxidant can be air or an oxygen enriched air from an enriched level of oxygen in a range from 20% oxygen by volume to 100% oxygen by volume. In embodiments of the present disclosure, non-enriched air can be used as the oxidant. The air can be compressed to increase efficiency and heat transfer. The pressure of the air oxidant can be in a range from 30 pounds per square inch absolute (psia) to 2,000 psia. A preferred pressure of the air oxidant can be in a range from 60 psia to 700 psia, and more specifically in a range from 60 psia to 280 psia. The oxidant temperature of the oxidant flowing through conduit 12 should be as high as possible and can be in a range from 200 degrees F. to 1,000 degrees F., in some embodiments. A preferred temperature of the oxidant flowing through conduit 12 can be in a range from 400 degrees F. to 600 degrees F.

The DSG can be operated in a steam generation condition where blowdown is created in conduit 15 or cyclone exit 16, which would produce a high concentration brine. A blowdown level can be from 2% to 30% with a preferred range of 3% to 10%. The steam, DSG exhaust (e.g., combustion exhaust constituents) and solids in conduit 6 can also be created to contain from 100% quality steam to a superheated steam condition. Steam in these conditions can precipitate the salts and any other remaining particles from the feedwater as solids. The salt solids would be separated from the steam in cyclone 7 and exit conduit 16. In some embodiments, the cyclone 7 can be configured to separate salt from the saturated steam and combustion exhaust constituents in at least one of brine form and solid form. In FIG. 1, pre-harvested commodities separated at pre-harvest stage 40 would be removed via pre-harvest conduit 41 and could be selected to net the value of the commodity harvested via pre-harvest conduit 41 or to improve the purity of the commodity at conduit 16. In an example of a 5,000 barrel per day system with 250,000 ppm salt solids and other valued inorganic material, the system would harvest approximately 170 tons per day of salt and valued material through conduit 16. This product has significant value and supports the economic viability of this process. Other valued inorganic material typically found in produced water can be lithium, silver, magnesium, aluminum and many other elements. In FIG. 1 these elements could be harvested at conduit 16 or pre-harvest conduit 41.

Steam energy in conduit 8 can be extracted in optional heat recovery system 9. Optional duct fired burner 10 can be used to optimize energy content in the system, for instance, the duct fired burner 10 can be used to trim a required energy in the system. For example, the duct fired burner 10 can add heat energy to the steam and DSG exhaust traveling through conduit 18. Conduit 17 can deliver fuel to the duct fired burner 18 which can be casing head gas or any other available fuel.

The steam and DSG exhaust in conduit 18 are processed through expansion turbine 19 to turn shaft 20, which can result in exhaust constituent expansion cooling. In some embodiments, the expansion turbine 19 can be part of an energy recovery system, which can recover energy from the steam and exhaust constituents. In an example, the expansion turbine can provide energy to an electrical generator. Optional asynchronous or synchronous generator 21 can be used to generate electricity from the extracted energy from expansion turbine 19. In some embodiments, the expansion turbine can provide energy for an oxidant compressor and/or blower. Compressor 22 is used to compress DSG oxidant which in this example is air. The air enters in conduit 34 and may be preheated with recovered energy from sources A or B in heat transfer system 13 (e.g., heat exchanger). The energy transferred via heat transfer system 13 may be modulated to control the DSG oxidant supply at a maximum desired temperature when the included heat of compression through compressor 22 is integrated. In this example 600 degrees F. is the desired control point for the inlet temperature to the DSG when the energy is summed from the ambient air, the energy recovered via heat transfer system 13 and the heat of compression generated from the compressor 22 (e.g., oxidant compression heating).

The remaining stored energy in conduit 23 from the expansion turbine 19 may be recovered in heat exchanger 14, which is denoted as heat source B. An optional condenser 24 with its cooling towers 25 may be used to fully condense the steam in conduit 26 to form distilled water which would exit conduit 27.

Figure 2:
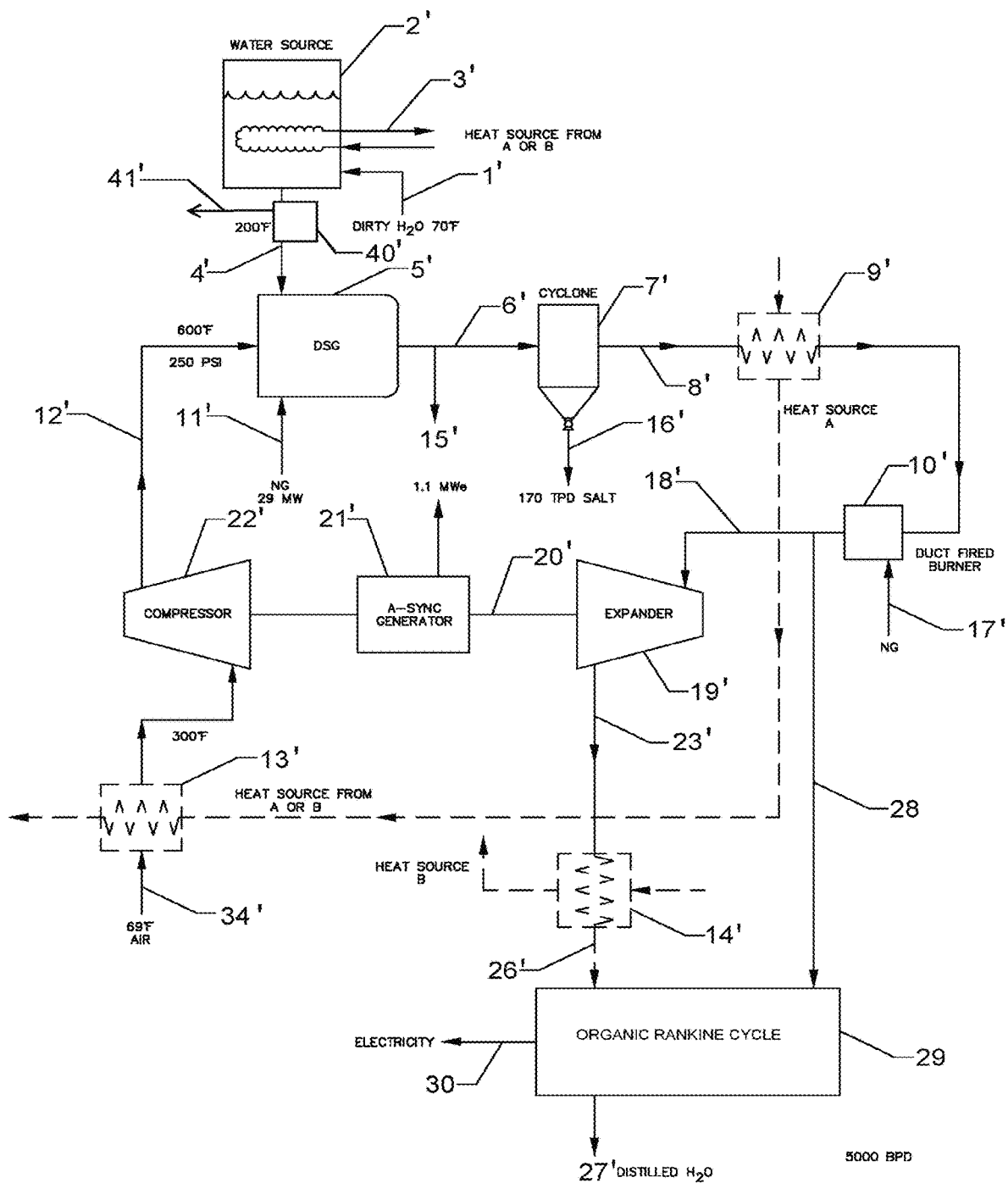
FIG. 2 depicts a second schematic representation of a dirty water distillation system and a salt, metals and other valuable commodity harvest system that includes a Rankine cycle generator system, in accordance with embodiments of the present disclosure.

FIG. 2 depicts a second schematic representation of a dirty water distillation system, salt, metals and other valuable commodity harvest system, method and apparatus, that includes a Rankine cycle generator system, in accordance with embodiments of the present disclosure. FIG. 2 shows the same basic system as depicted in FIG. 1 with the addition of an optional Rankine cycle generator system or an optional Organic Rankine cycle generation system 29. For example, FIG. 2 includes the same or similar features as FIG. 1, as denoted by the reference numerals that include "primes", with the exception that FIG. 2 depicts the addition of an optional Rankine cycle generator system or the optional Organic Rankine cycle generation system 29. For example, the DSG 5 depicted in FIG. 1 can be the same as DSG 5'. The optional Rankine cycle generator system or the optional Organic Rankine cycle generator system 29 can be fed energy in the form of DSG exhaust, steam and/or steam condensate from conduit 26' and/or conduit 28. For example, DSG exhaust, steam and/or steam condensate can be provided to the optional Rankine cycle generator system or the optional Organic Rankine cycle generator system 29 solely via conduit 26' or conduit 28 or provided via conduits 26' and 28 combined. In some embodiments, electricity 30 can be generated via the optional Rankine cycle generator system or the optional Organic Rankine cycle generator system 29. Although the Rankine cycle generator system 29 is depicted as an Organic Rankine cycle generator system, the system 29 can also be a Rankine cycle generator system.

Figure 3:
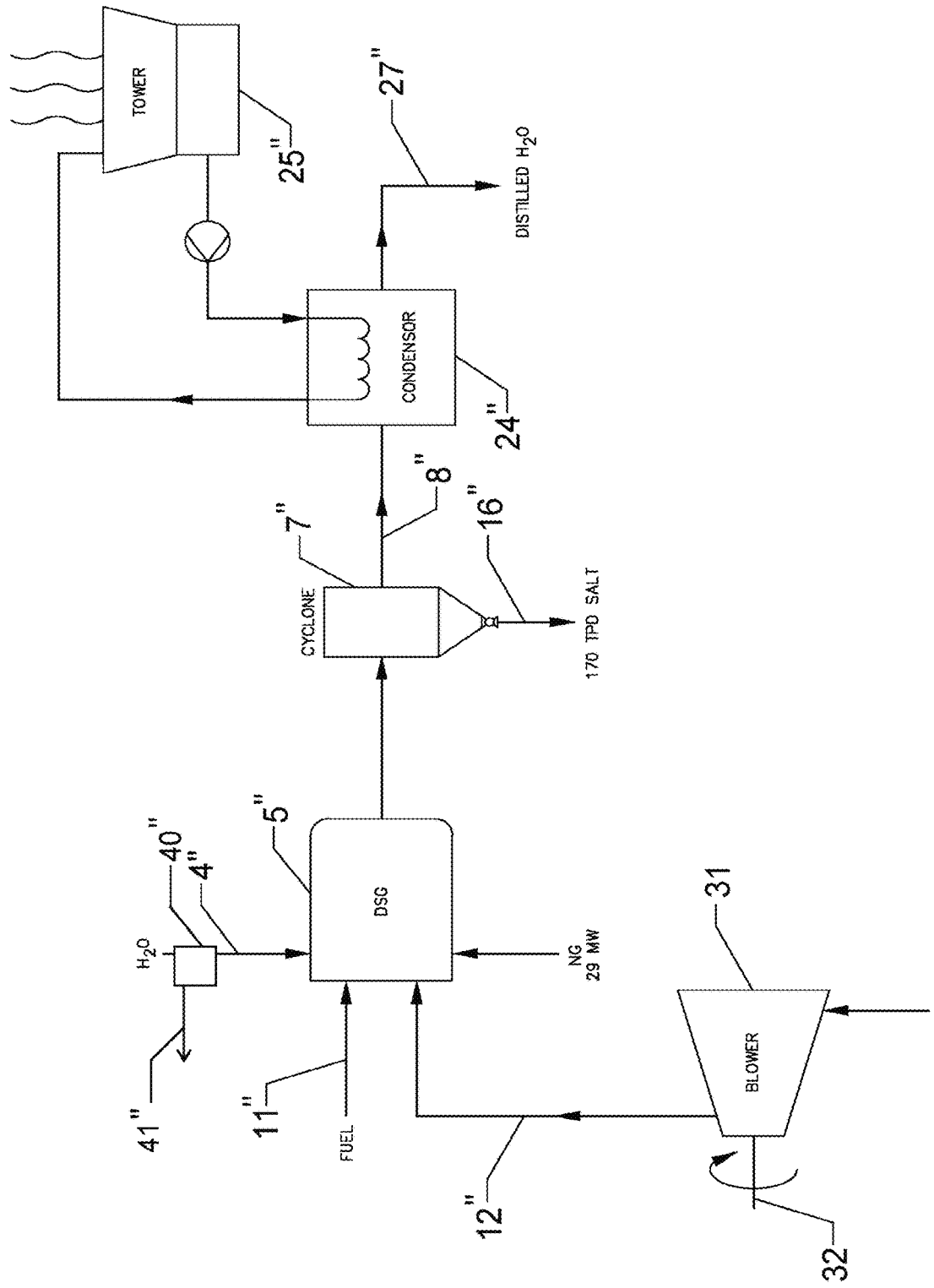
FIG. 3 depicts a third schematic representation of a dirty water distillation system and a salt, metals and other valuable commodity harvest system, method, and apparatus in accordance with embodiments of the present disclosure.

FIG. 3 depicts a third schematic representation of a dirty water distillation system and a salt, metals and other valuable commodity harvest system, method, and apparatus in accordance with embodiments of the present disclosure. The system depicted in FIG. 3 includes the same or similar features as FIG. 1, as denoted by the reference numerals that include double "primes", with the exception that the system in FIG. 3 depicts the addition of a compressor 31, which can be driven by shaft 32, as further discussed herein. For example, FIG. 3 depicts a simplified system that communicates the DSG exhaust and steam directly with a condenser 24" to make distilled water in conduit 27" and generates compressed oxidant in conduit 12" for the DSG by using a shaft driven blower or compressor 31. For example, FIG. 3 includes the same or similar features as FIG. 1, as denoted by the reference numerals, with the exception that the system in FIG. 3 communicates the DSG exhaust and steam directly with a condenser 24" to make distilled water in conduit 27" and generates compressed oxidant in conduit 12" for the DSG by using a shaft driven blower or compressor 31. The power to turn the shaft 32 can be generated from an electric motor driven by a casing head fueled or other hydrocarbon fuel sourced internal combustion generator or Brayton cycle generator. The shaft 32 can also be powered directly by an internal combustion engine or Brayton cycle turbine operating on any fuel such as natural gas, diesel or casing head gas. The oxidant could also be compressed by the systems described herein in FIGS. 4 and 5.

Figure 4:
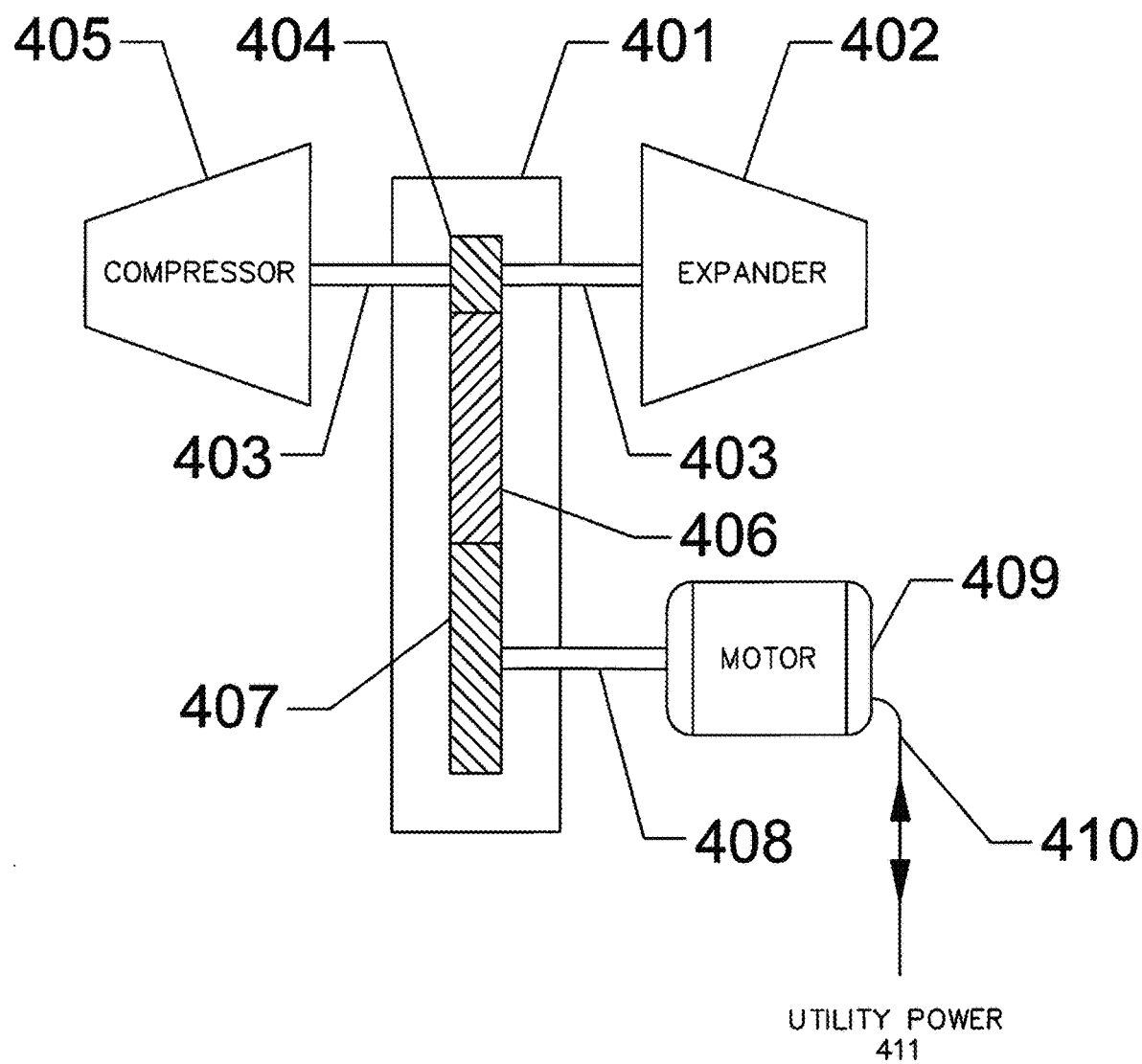
FIG. 4 depicts an alternate energy recovery and compression system, in accordance with embodiments of the present disclosure.
Figure 5:
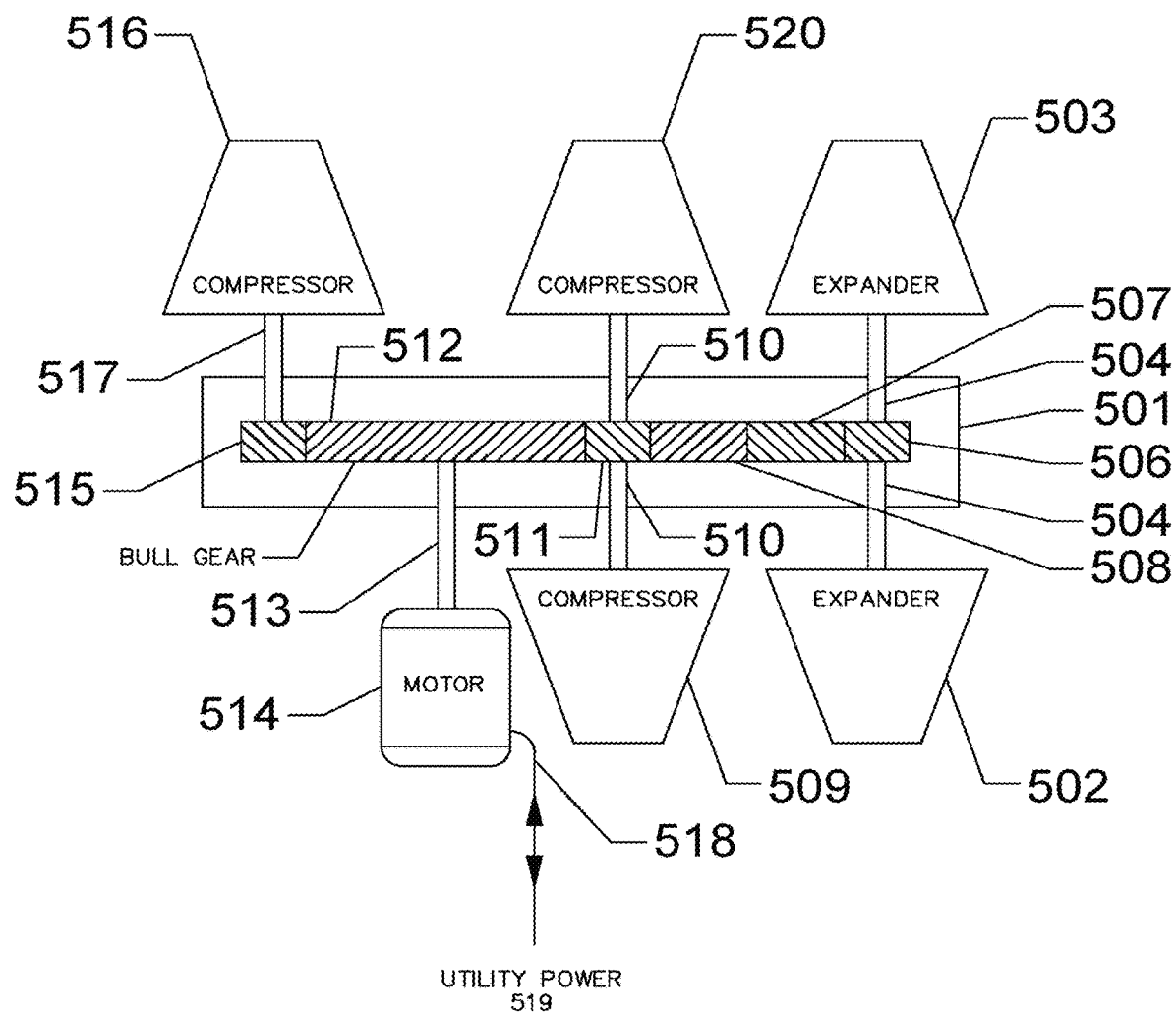
FIG. 5 depicts another alternate energy recovery and compression system, in accordance with embodiments of the present disclosure.

Other compression and energy recovery systems which can substituted for items 19, 20, 21 and 22, as depicted and discussed in relation to FIGS. 1 and 2 are shown in FIGS. 4 and 5. FIG. 4 depicts an alternate energy recovery and compression system, in accordance with embodiments of the present disclosure. For example, FIG. 4 depicts another energy recovery and compression system that can be used in steam generation in accordance with this invention. A gear housing 401 contains gears 404, 406 and 407. Gear 404 is coupled to shaft 403 which joins compressor stage 405 to expander or energy recovery stage 402. A gear ratio can be developed between gears 404, 406 and 407 to communicate power to or from motor 409. Motor 409 is tied to utility line 410, which can provide utility power 411 to or from the motor 409, and can act as a motor or generator depending on the conditions in expander 402 and compressor 405. As an example, if there is less transferred energy in 402 than is required to operate the compressor 405 then 409 will be required to act as a motor. If there is more energy recovered in expander 402 than is required to drive the compressor 405 then 409 will act as a generator and produce electrical energy.

FIG. 5 depicts another alternate energy recovery and compression system, in accordance with embodiments of the present disclosure. For example, FIG. 5 depicts another energy recovery and compression system that can be used in steam generation in accordance with this invention. Gear housing 501 includes gears 506, 507, 508, 511, 512 and 515. In this example, 6 gears are shown but any number of gears can be used depending on the desired gear ratios and the number of interconnected stages. This example shows 2 stages of expansion shown as items 503 and 502 and 3 stages of compression shown as items 516, 509 and 520 for a total of 5 interconnected stages. The expanders 502, 503 can be tied to the gear 506 via shaft 504. The compressors 509, 520 can be tied to the gear 511 via shaft 510. The compressor 516 can be tied to the gear 515 via shaft 517. Stages can range from 2 stages as shown in FIG. 4 to over 15 stages but preferably range from 2 stages to 9 stages. Motor 514 is again in communication with utility 519 via utility line 518 and can operate as a motor or as a generator as described in the previous paragraph in relation to FIG. 4. The motor 514 is coupled to the gear 512 via shaft 513. A heat exchanger or a series of heat exchangers (not shown) can be used for interstage heat transfer to improve efficiencies and operating ranges.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the endoscope of the embodiments, the endoscope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although at least one embodiment for a dirty water distillation and salt harvesting system, method, and apparatus has been described above with a certain degree of particularity, those skilled in the art could make numerous alterations to the disclosed embodiments without departing from the spirit or scope of this disclosure. Additional aspects of the present disclosure will be apparent upon review of Appendix A1. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

We claim:

1. A system of harvesting salt and a metal, comprising:
a direct steam generator (DSG) configured to generate steam that includes superheated steam and combustion exhaust constituents;
a separation system operating after the DSG, wherein the steam is fed to the separation system, wherein the system is configured to separate salt and a metal selected from the group consisting of lithium, silver, magnesium, and aluminum from the steam and combustion exhaust constituents in a brine form.

2. The system of claim 1, wherein an oxidant for the DSG includes pure air heated to a temperature between 400 and 600 degrees Fahrenheit.

3. The system of claim 1, wherein an oxidant for the DSG includes oxygen enriched air that is enriched with up to 100% oxygen by volume.

4. The system of claim 1, wherein a fuel for the DSG includes casing head gas.

5. The system of claim 1, further comprising an expansion turbine configured to recover energy from the steam and exhaust constituents, wherein the expansion turbine provides energy for an electrical generator.

6. The system of claim 5, wherein the expansion turbine further provides energy for an oxidant compressor, wherein the oxidant compressor pressurizes an oxidant for the DSG to a pressure in a range from 60 pounds per square inch absolute (psia) to 280 psia.

7. The system of claim 5, wherein the expansion turbine additionally provides energy for an oxidant compressor or blower.

8. The system of claim 7, wherein the oxidant compressor or blower is powered by at least one of an electric motor, Brayton cycle turbine, or an internal combustion engine.

9. The system of claim 8, wherein at least one of the Brayton cycle turbine or the internal combustion engine is powered by casing head gas.

10. The system of claim 8, further comprising at least one of a Brayton cycle generator or an internal combustion generator fueled by at least one of natural gas or casing head gas, configured to generate electricity to power the oxidant compressor or blower.

11. A system of harvesting salt and a metal, comprising:
a direct steam generator (DSG) configured to generate steam that includes superheated steam, and combustion exhaust constituents;
a separation system operating after the DSG, configured to separate a salt and a metal selected from the group consisting of lithium, silver, magnesium, and aluminum in brine form and other commodities from the steam and exhaust constituents.

12. The system of claim 11, further comprising a duct fired burner that is configured to trim required energy in the system.

13. The system of claim 12, wherein the duct fired burner is fueled by casing head gas.

14. The system of claim 11, wherein heat recovery from the generated steam is used to maintain an elevated temperature in a feedwater and an oxidant provided to the DSG.

15. The system of claim 11, further comprising a Rankine cycle generator, wherein the Rankine Cycle generator is configured to generate electricity from the generated steam.

16. The system of claim 11, further comprising an organic Rankine cycle generator, wherein the organic Rankine cycle generator is configured to generate electricity from the generated steam.

17. A system of harvesting salt, metals, and generating distilled water from at least one of a produced water or salt water, comprising:
a direct steam generator (DSG) configured to generate steam that includes superheated steam and combustion exhaust constituents;
a commodity pre-harvesting stage operating before the DSG, wherein the pre-harvesting stage includes a pre-harvesting conduit, wherein the commodity pre-harvesting stage is configured to remove and collect the metals; and
a separation system operating after the DSG, configured to separate salt and lithium, silver, magnesium, or aluminum from the steam and combustion exhaust constituents in a brine form.

18. The system of claim 17, further comprising an energy recovery system that includes an expansion turbine configured to recover energy from the steam and exhaust constituents, wherein the energy recovery system includes compression and expansion stages that are tied together by shafts and gears in communication with each other, wherein the shafts and gears reside in a common housing.

19. The system of claim 18, wherein the energy recovery system has greater than one stage of compression.

20. The system of claim 19, where the energy recovery system includes an exhaust constituent expansion cooling that is coupled to an oxidant compression heating.

* * * * *